United States Patent
Abboud et al.

(10) Patent No.: US 12,527,581 B1
(45) Date of Patent: Jan. 20, 2026

(54) DRILL BIT HAVING ROUGHNESS AREAS

(71) Applicants: Marcus Abboud, Avon, CO (US);
Sihana Rugova, Avon, CO (US)

(72) Inventors: Marcus Abboud, Avon, CO (US);
Sihana Rugova, Avon, CO (US)

( * ) Notice: Subject to any disclaimer, the term of this patent is extended or adjusted under 35 U.S.C. 154(b) by 0 days.

(21) Appl. No.: 18/932,245

(22) Filed: Oct. 30, 2024

(51) Int. Cl.
*A61B 17/16* (2006.01)

(52) U.S. Cl.
CPC .............................. *A61B 17/1615* (2013.01)

(58) Field of Classification Search
CPC . A61B 17/16; A61B 17/1613; A61B 17/1615; A61B 17/1617; A61B 17/162; A61B 17/1622; A61B 17/1624; A61B 17/1626; A61B 17/1628; B23B 51/02
See application file for complete search history.

(56) References Cited

U.S. PATENT DOCUMENTS

| | | | |
|---|---|---|---|
| 2004/0187979 A1* | 9/2004 | LeClaire | B23B 51/04 148/559 |
| 2008/0199265 A1* | 8/2008 | Hamatake | B23C 5/10 407/54 |
| 2017/0232529 A1* | 8/2017 | Kawakami | B23B 51/02 408/230 |
| 2023/0226620 A1* | 7/2023 | Kauper | B24B 19/04 408/227 |

FOREIGN PATENT DOCUMENTS

| | | | | |
|---|---|---|---|---|
| AU | 2020213319 A1 | * | 4/2021 | ............ B23B 51/00 |
| AU | 2020213319 B2 | * | 3/2022 | ............ B23B 51/00 |
| AU | 2022204224 A1 | * | 7/2022 | ............ B23B 51/00 |
| AU | 2022204224 B2 | * | 4/2024 | ............ B23B 51/00 |
| CA | 3091379 A1 | * | 3/2021 | ............ B23B 51/00 |
| CA | 3091379 C | * | 11/2022 | ............ B23B 51/00 |
| CN | 104117715 A | * | 10/2014 | ............ B23B 51/02 |
| CN | 102149497 B | * | 1/2015 | ............ B23B 51/02 |
| CN | 206200193 U | * | 5/2017 | |
| DE | 102022101190 A1 | * | 7/2023 | ............ B23B 51/02 |
| GB | 2606266 A | * | 11/2022 | ............ B23B 51/00 |

* cited by examiner

*Primary Examiner* — Eric S Gibson
(74) *Attorney, Agent, or Firm* — CM Law PLLC; Robert C. Klinger

(57) ABSTRACT

A drill bit having roughness areas in a flute to reduce debris clogging in the flute during drilling, reduce temperatures of the drill bit and material being drilled, and lubricate the drill bit during drilling among other features. The drill bit is useful to drill in many unique materials including mammalian bone to reduce or eliminate bone chips occluding the flute. The roughness areas evacuate the bone chips quickly and efficiently and generate a low temperature of the drill bit and drilled material.

8 Claims, 5 Drawing Sheets

US 12,527,581 B1

DRILL BIT HAVING ROUGHNESS AREAS

TECHNICAL FIELD

The present disclosure relates to drill bits, including but not limited to bits for bone drilling purposes.

BACKGROUND

Drill bits cut through material and generate debris, such as bone chips. The removal of the debris during drilling is inhibited by the friction of the drill bit, and elevated temperatures generated during drilling need to be controlled.

DETAILED DESCRIPTION

Figure 1:
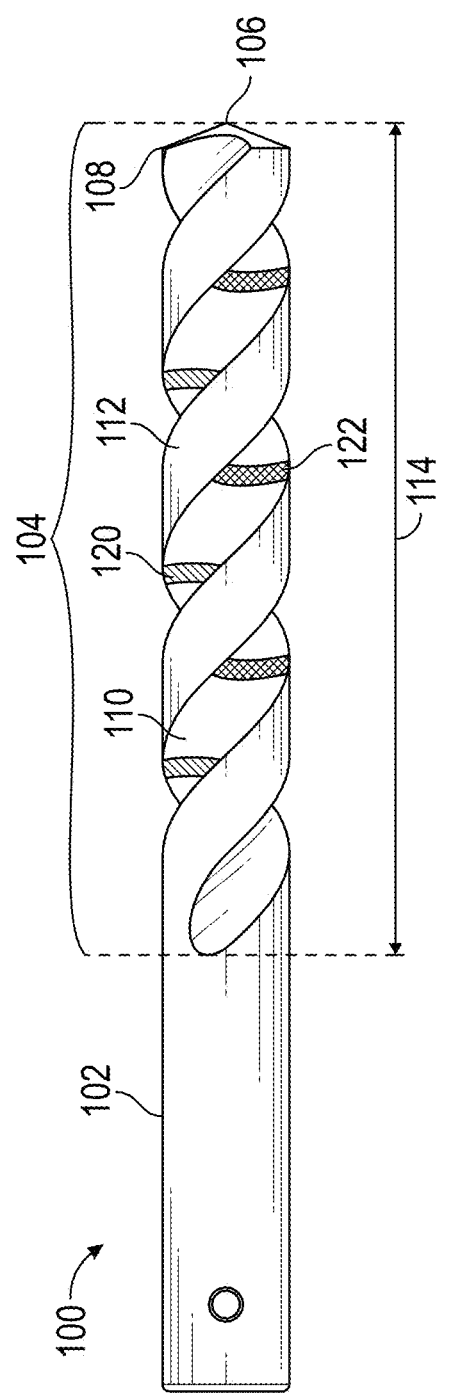
FIG. 1 is a perspective view of a drill bit having spaced roughness areas shown as bands in a flute along the length of the flute.

This disclosure includes a drill bit having roughness areas in a flute to reduce debris clogging in the flute during drilling, reduce temperatures of the drill bit and material being drilled, and lubricate the drill bit during drilling among other features. The drill bit is useful to drill in many unique materials including mammalian bone to reduce or eliminate bone chips occluding the flute. The roughness areas evacuate the bone chips quickly and efficiently and generate a low temperature of the drill bit and drilled material.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals, or light produced or supplied by one system element are imparted to another coupled element. Unless described otherwise, coupled elements or devices are not necessarily directly connected to one another and may be separated by intermediate components, elements or communication media that may modify, manipulate or carry the light, sound, or signals.

As a drill bit cuts through a material, debris, such as bone chips, generated are trapped between a wall of a drilled hole and a flute of the drill bit. This makes it difficult to evacuate the bone chips quickly and efficiently. As the drill bit advances deeper into the material during drilling, more bone chips fill the flute, causing the bone chips to get clogged together due to extreme pressure and create an occlusion in the flute. This leads to a higher chip evacuation force, which is not ideal for the tool's functionality and the consequent heat development due to friction. In addition, the reachability of cutting fluids at a cutting zone while drilling at higher depths is always a challenging task due to the blockage of cutting fluids by the clogged chips.

It is important to minimize chip evacuation force to ensure better tool performance and reduce heat generation during the drilling process. It is also important to prevent the chips from getting trapped and stuck in the drill bit to create a highly polished and smooth surface inside the flute. This helps the material to slide easily on the smooth surface, reducing the adhesion to the surface. As seen in many research studies looking at temperature during drilling, this is not always working and very high temperatures can be generated by clogged drill bits.

This disclosure includes a drill bit having an outer material finish that incorporates rough areas and topographic patterns to increase the functionality of the drill bit by more efficient removal of material at the tip and the flute of the drill bit.

Referring to FIG. 1 there is shown a longitudinally extending drill bit 100 having a shank 102 at a proximal end and a body 104 extending from the shank 102 to a distal end including a cutting tip 106. Tip 106 includes a lip relief 108. In the embodiment shown, body 104 includes a helical shaped (helix) flute 110 and land area 112. In another embodiment, the flute can be straight or bent, and limitation to a helical shaped flute is not to be inferred. Flute 110 has a flute length shown at 114. Flute 110 has rough portions formed in a surface of the flute 110, also referred to herein as rough areas and microroughness, that aid in debris removal by reducing adhesion forces during drilling, thereby preventing debris from sticking to the drill bit surface including flute 110. Land area 112 is smooth to avoid increasing friction with the surrounding material. In an example, drill bit 100 includes alternating bands of rough areas that are transverse to the length of the flute 110 shown as spaced and alternating bands 120 and 122. The traverse bands are uniquely shaped and have a leading edge facing the debris as it moves along the flute 110 to control friction and a temperature of the drill bit 100 and the drilled material. Bands 120 and 122 are rough, which is defined as not being smooth. The bands 120 and 122 have different roughness, referred to as vertical deviations in the flute surface, also referred to as topographic changes, that create micro-roughness areas which is defined as vertical deviations of 1 micron and less. The different roughness of the bands 120 and 122 provide different friction to the debris as it moves along the flute to help increase the rate of debris removal. The microroughness facilitates and enhances the chip-breaking process, especially at the front or tip 106 of the drill bit 100, ensuring that debris is fragmented into smaller pieces for easier evacuation. The microroughness creates a pathway that guides the evacuation of debris efficiently. This is especially true for microroughness oriented longitudinally along the flutes 110 and/or tip 106.

This range of micro-roughness of 1 micron and less is critical to reduce a temperature of the drill bit 100 and the material during drilling such as mammalian bone, increase drilling efficiency, and increase a rate of debris removal. A roughness of over 1 micron can generate too much friction and higher temperatures of the drill bit 100 and the material being drilled. Bands 120 and 122 reduce material adhesion forces during drilling, and also have micro-sized pockets that hold lubrication fluids used in a drilling process that reduces a temperature of the drill bit 100 and the material during drilling, increases drilling efficiency and increases a rate of debris removal. Further benefits include:

Improving the efficiency and longevity of the tools;
Reducing the contact time between the tool and the chips;
Increasing the chip breaker effect;
Reducing the entrapment of wear debris;
Enhancing the hydrodynamic effect, which helps to retain lubricant in the micro-cavities for improved load-carrying capacity;
Increasing the anti-adhesive properties; and
Improving the effectiveness of chip transportation.

A preferred surface roughness of flute 110 to break adhesion forces typically depends on the specific application and the materials involved. A preferred Surface Roughness (Ra) for metal drill bits, including steel and titanium may be in the range of 0.2 to 0.6 micrometers (μm) is effective. This range provides enough texture to disrupt adhesive forces without compromising the structural integrity or performance of the tool. The roughness range varies based on cutting speeds and feed rates. For soft materials, like aluminum or plastic, a slightly higher roughness of around 0.6 to 0.8 μm may be better to prevent material build-up.

In an example, the roughness of the bands 122 is at least twice as rough as the bands 120. This feature can increase a performance of the drill bit 100 such as allowing faster cutting speeds and other parameters. A surface of the drill bit 100 including the flute 110 and land area 112 is coated with a material, such as titanium nitride or a diamond-like coating (DLC) to reduce friction and generating temperature during drilling.

Figure 2:
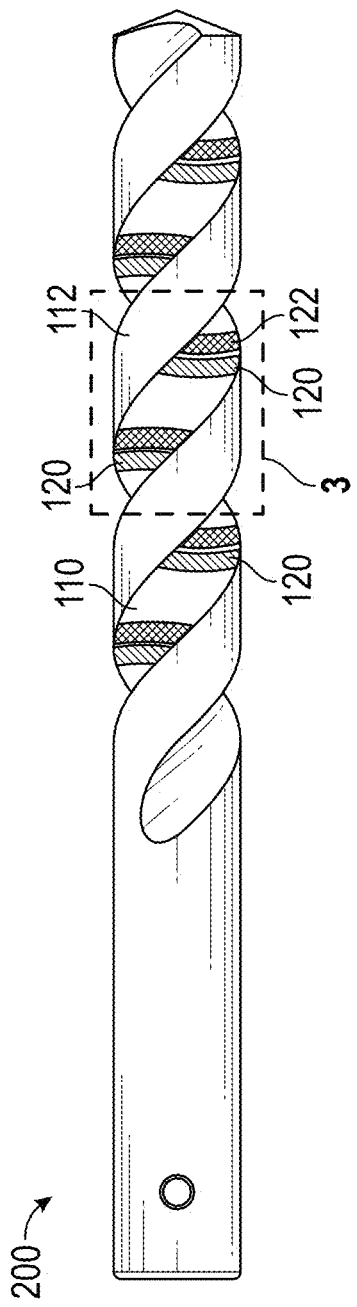
FIG. 2 is a perspective view of a drill bit according to another embodiment where pairs of bands having roughness are positioned close to each other, where multiple pairs of the bands are spaced along a length of the flute.
Figure 3:
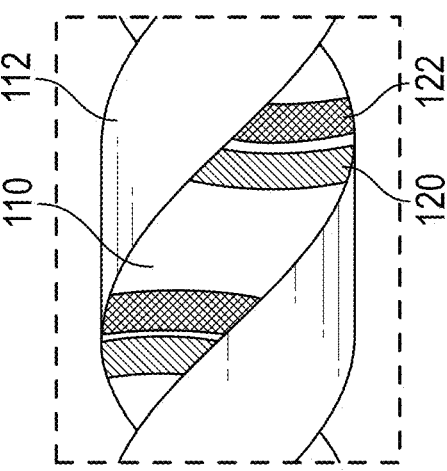
FIG. 3 is an enlarged view of an area of the drill bit of FIG. 2.

FIG. 2 illustrates a drill bit 200 that is similar to drill bit 100, wherein the bands 120 and 122 are closely positioned next to each other with a small space having a smooth surface between the bands to form a pair of bands. FIG. 3 illustrates an enlarged area 300 shown in dotted lines at 3 in FIG. 2. The pairs of bands are separated one another by a portion having a smooth surface, where the spacing between the pair of bands is uniform. Preferably, the total area of flute 110 is about 60% smooth, and about 40% includes the bands 120 and 122 to reduce friction while holding adequate lubrication to reduce occluding the flute 110 with debris during drilling.

Figure 4:
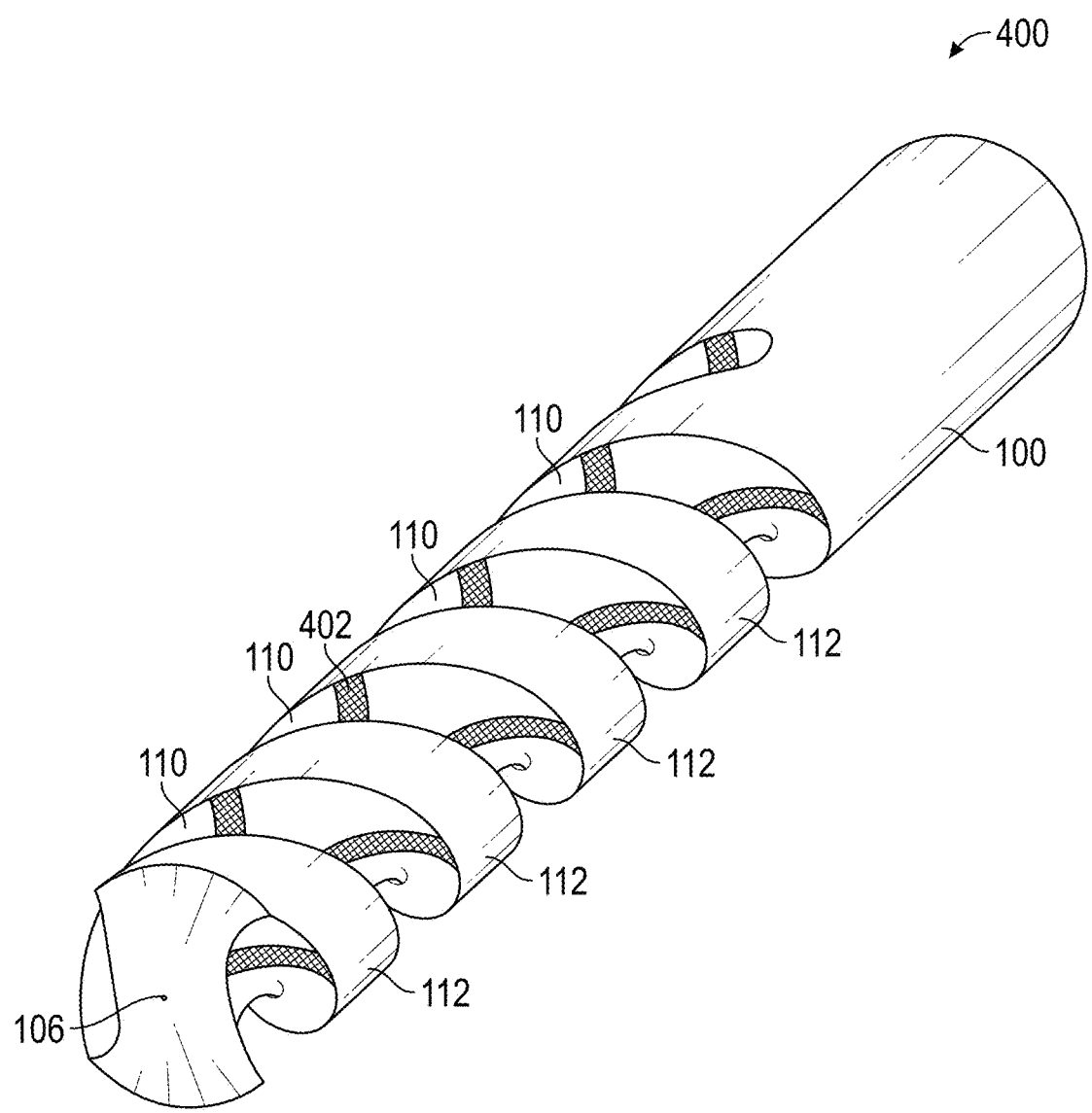
FIG. 4 is a perspective view of a drill bit according to another embodiment where the roughness area is a line extending a length of the flute.

FIG. 4 illustrates a drill bit 400 having longitudinally extending roughness area 402 forming a line extending the length of flute 110 from shank 102 to tip 106. One or more lines of roughness area 402 can be provided. This design may be more efficient for drilling in certain materials.

Figure 5:
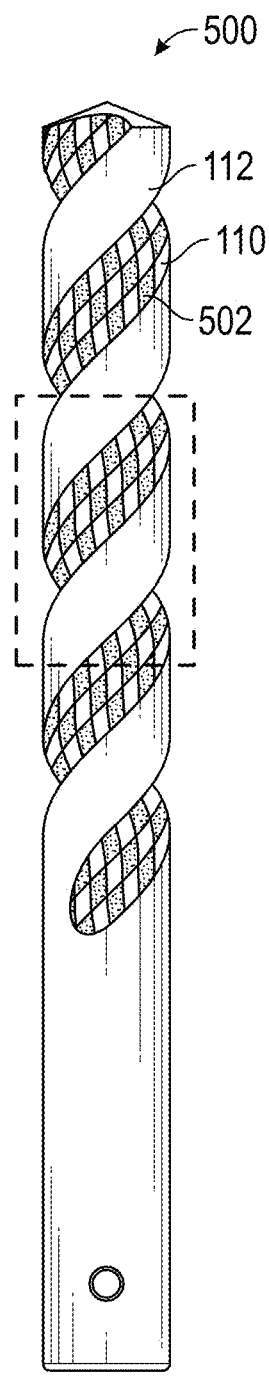
FIG. 5 is a perspective view of a drill bit according to another embodiment where the roughness area has a chessboard-like pattern of rough and smooth areas.
Figure 6:
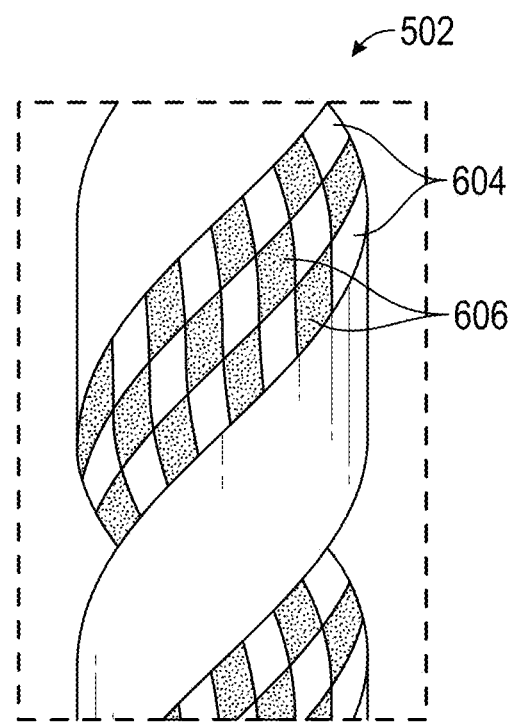
FIG. 6 is an enlarged view of the chessboard-like pattern of FIG. 5.

FIG. 5 illustrates a drill bit 500 including a patterned roughness area 502 having a chessboard-like pattern longitudinally extending the length of flute 110 from shank 102 to tip 106. FIG. 6 shows an enlarged view of the patterned roughness area 502 of flute 110 corresponding to the dotted lines in FIG. 5. The shaded areas represent portions of the flute 110 having micro-roughness and include pockets designed to hold a lubricant fluid during a drilling process. The non-shaded areas are smooth. The patterned roughness area 502 provides evenly spaced smooth areas and areas having micro-roughness along the length of flute 110 which provides closely and evenly spaced pockets holding the lubricant, and also reduces surface friction such that drill bit 100 has an even temperature along its length during drilling. As shown in FIG. 5, the patterned roughness area 502 is formed in the flute surface and extends along the entire length of the flute from the shank to the tip. In another embodiment, the patterned roughness area 502 may be formed in only certain sections of the flute 110. For example, the patterned roughness area 502 may form 40% of the flute and the other 60% of the flute 110 is smooth. As previously described, this ratio is critical to reduce friction and clear debris.

Figure 7:
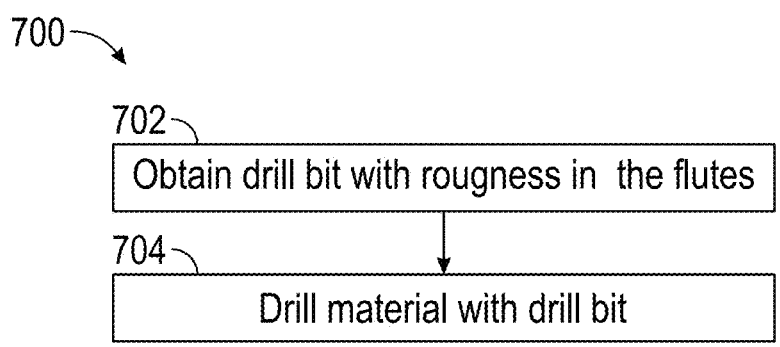
FIG. 7 is a method of using the drill bit to drill into a material.

FIG. 7 illustrates a method 700 of using the drill bits.

At block 702, a drill bit having roughness portions as described with respect to FIG. 1-FIG. 6 is obtained. The user secures the drill bit in a drill such as using a chuck.

At block 704, the drill rotates the drill bit. The user urges the drill bit against a material to drill a hole in the material, such as bone.

Creating uneven surface patterns inside the flute of a drill bit requires a combination of advanced manufacturing techniques and precise engineering. The chosen method will depend on the complexity of the pattern, material properties, and production scale. There are multiple manufacturing process to establish this topographic pattern:

CNC Machining

Computer Numerical Control (CNC) Milling: Use CNC machines to create intricate and precise roughness areas having even and uneven patterns inside the flute. By programming the CNC machine with specific patterns, the depth and shape of the roughness areas of the surface is controlled.

Grinding

Surface Grinding: Use specialized grinding tools to create the desired roughness areas and patterns. Diamond grinding wheels can be used to grind specific patterns into the flute.

Electrochemical Grinding (ECG): This combines electrochemical machining with conventional grinding. It is useful for creating complex patterns with high precision.

Laser Etching

Laser Engraving: Use high-powered lasers to etch the roughness areas and patterns into the flute. This method allows for very precise control and can create detailed and complex patterns.

Electrochemical Machining (ECM)

ECM Process: This non-traditional machining process can be used to create complex and precise patterns of roughness areas on the surface of the flute without causing thermal or mechanical stress to the material.

Additive Manufacturing

3D Printing: Use metal 3D printing techniques like Direct Metal Laser Sintering (DMLS) or Electron Beam Melting (EBM) to create drill bits with the desired internal flute patterns directly.

Selective Laser Melting (SLM): This is another form of 3D printing that can be used to create complex internal geometries.

Surface Treatment and Coating

PVD Coating: Physical Vapor Deposition (PVD) can be used to deposit thin films with specific patterns onto the flute surface.

Other Surface Coating: TiN, DLC etc.

Chemical Etching: Use chemical etching techniques to create patterns of roughness areas on the flute. This involves applying a resist to the flute and then using chemicals to etch away the exposed areas.

Blasting: Use micro-abrasive blasting with fine media to produce consistent roughness.

Electrical Discharge Machining (EDM)

Wire EDM or Sink EDM: These methods use electrical discharges to erode material and can be used to create precise and intricate patterns of roughness areas inside the flutes.

The dimensions of the grooves/patterns can vary from micrometer to nanometer scale, with the number of patterns ranging from one to many within the same flute.

Laser etching is one preferred process as lasers are quicker than other processes to form the roughness areas and less expensive on a per unit basis. For example, lasers can create the roughness areas in the flute in a time between 25 seconds and 2 minutes depending on the characteristics of the roughness areas, although times will vary depending on the drill bit material, the complexity of the roughness areas, and other parameters. Pulsed lasers provide more control of the laser etching process but are also more expensive than non-pulsed lasers.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

What is claimed is:

1. A drill bit, comprising:
   a body;
   a flute extending along a length of the body and having an area comprising a smooth portion; and
   a plurality of roughness areas formed in a surface of the flute and spaced from one another along a length of the flute and configured to reduce friction to debris formed in the flute during drilling and to hold lubrication, wherein the area of the smooth portion is greater than the plurality of roughness areas.

2. The drill bit of claim 1, wherein the roughness areas have different roughness.

3. The drill bit of claim 2, wherein the roughness areas comprise of a pair of bands.

4. The drill bit of claim 3, wherein the bands are spaced from one another by an area having a smooth surface.

5. The drill bit of claim 4, wherein a first pair of bands is spaced along a length of the flute from a second pair of bands by a portion having a smooth surface.

6. The drill bit of claim 1, wherein the roughness area has a roughness of 1 micron or less.

7. The drill bit of claim 1, further comprising a coating disposed on a surface of the drill bit.

8. A drill bit, comprising:
   a body;
   a flute extending along a length of the body and having an area comprising a smooth portion; and
   at least one roughness area formed in a surface of the flute and configured to reduce friction to debris formed in the flute during drilling and to hold lubrication, wherein the area of the smooth portion is greater than the at least one roughness area,
   wherein the at least one roughness area is comprised of a band that is transverse to a length of the flute.

* * * * *